United States Patent
Arthur et al.

(10) Patent No.: US 8,232,014 B2
(45) Date of Patent: Jul. 31, 2012

(54) FUEL CELL OPERATIONAL METHODS FOR HYDROGEN ADDITION AFTER SHUTDOWN

(75) Inventors: David A. Arthur, Honeoye Falls, NY (US); Dieter Kaimann, Mainz (DE); Thomas W. Tighe, Bloomfield, NY (US); Steven G. Goebel, Victor, NY (US); John P. Salvador, Penfield, NY (US); Gary M. Robb, Honeoye Falls, NY (US); Daniel I. Harris, Honeoye Falls, NY (US); Joseph Nicholas Lovria, Honeoye Falls, NY (US); Balasubramanian Lakshmanan, Pittsford, NY (US); Daniel T. Folmsbee, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 348 days.

(21) Appl. No.: 12/636,318

(22) Filed: Dec. 11, 2009

(65) Prior Publication Data
US 2011/0143243 A1     Jun. 16, 2011

(51) Int. Cl.
H01M 8/04    (2006.01)

(52) U.S. Cl. .......................................... 429/429

(58) Field of Classification Search .................... 429/429
See application file for complete search history.

(56) References Cited

U.S. PATENT DOCUMENTS

| | | | |
|---|---|---|---|
| 6,635,370 B2 | 10/2003 | Condit et al. | |
| 6,818,336 B2 * | 11/2004 | Isom et al. | ..................... 429/425 |
| 6,835,479 B2 | 12/2004 | Balliet et al. | |
| 6,984,464 B2 | 1/2006 | Margiott et al. | |
| 7,141,324 B2 | 11/2006 | Margiott et al. | |
| 2008/0038602 A1 | 2/2008 | Yu et al. | |
| 2008/0145716 A1 | 6/2008 | Yu et al. | |
| 2009/0214906 A1 * | 8/2009 | Reiser et al. | ..................... 429/17 |

* cited by examiner

*Primary Examiner* — Gregg Cantelmo
(74) *Attorney, Agent, or Firm* — John A. Miller; Miller IP Group, PLC

(57) ABSTRACT

A method for reducing the probability of an air/hydrogen front in a fuel cell stack is disclosed that includes closing anode valves for an anode side of the fuel cell stack to permit a desired quantity of hydrogen to be left in the anode side upon shutdown and determining a schedule to inject hydrogen during the time the fuel cell stack is shutdown. The pressure on an anode input line is determined and a discrete amount of hydrogen is injected into the anode side of the stack according to the determined schedule by opening anode input line valves based on the determined pressure along the anode input line so as to inject the hydrogen into the anode side of the stack.

35 Claims, 3 Drawing Sheets

FUEL CELL OPERATIONAL METHODS FOR HYDROGEN ADDITION AFTER SHUTDOWN

BACKGROUND OF THE INVENTION

1. Field of the Invention

This invention relates generally to a method for reducing the frequency of air/hydrogen fronts in a fuel cell stack and, more particularly, to a method for periodically injecting hydrogen into a fuel cell stack after system shutdown to consume low levels of oxygen as it diffuses back into the stack, increasing the length of time before the stack contents switch from a hydrogen/nitrogen mixture to an oxygen/nitrogen mixture.

2. Discussion of the Related Art

Hydrogen is a very attractive fuel because it is renewable and can be used to efficiently produce electricity in a fuel cell with no harmful emissions. A hydrogen fuel cell is an electrochemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes, or catalyst layers, typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, the gas diffusion layer (GDL), that protects the mechanical integrity of the membrane and also helps in uniform reactant and humidity distribution. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. The fuel cell stack also receives an anode hydrogen input gas that flows into the anode side of the stack. Not all of the oxygen is consumed by the stack and some of the air is output as a cathode exhaust gas that may include water as a by-product of the chemical reaction taking place in the stack.

The fuel cell stack includes a series of bipolar plates positioned between the several MEAs in the stack, where the bipolar plates and the MEAs are positioned between two end plates. The bipolar plates include anode side and cathode side flow distributors, or flow fields, for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

When a fuel cell system is shutdown, the stack can either be left with an excess of hydrogen or oxygen, or the system can attempt to simultaneously consume both reactants. In the first case, unreacted hydrogen gas remains in the anode side of the fuel cell stack. This hydrogen gas is able to diffuse through or cross over the membrane and react with the oxygen on the cathode side of the stack. As the hydrogen gas diffuses to the cathode side, the total pressure on the anode side of the stack is reduced. Some oxygen will be left in the cathode plumbing, and will slowly re-enter the cathode flowfield, either by convective or diffusive forces. Most of it will react with hydrogen that is locally present in the cell. Eventually, the local hydrogen in a cell will be consumed, and oxygen will start to concentrate. Eventually, oxygen will locally permeate the membrane to the anode.

When the air enters the anode side of the stack it generates an air/hydrogen front that creates a short circuit in the anode side, resulting in a lateral flow of hydrogen ions from the hydrogen flooded portion of the anode side to the air-flooded portion of the anode side. The lateral current combined with the high lateral ionic resistance of the membrane produces a significant lateral potential difference (~0.5 V) across the membrane. A locally high potential is produced between the cathode side opposite the air-filled portion of the anode side. The high potential adjacent to the electrolyte membrane drives rapid carbon corrosion, and causes the electrode carbon layer to thin. This decreases the support for the catalyst particles, which decreases the performance of the fuel cell.

In automotive applications, there are a large number of start and stop cycles required over the life of the fuel cell system, each of which may generate an air/hydrogen front as described above. Targets of 40,000 start and stop cycles would be considered reasonable. Leaving a stack in an oxygen-rich atmosphere at shutdown results in a damaging air/hydrogen event at both shutdown and startup, where 2 to 5 μV of degradation per start and stop cycle is plausible. Thus, the total degradation over 40,000 start and stop cycle events is on the order of 100 or more mV. If the stack is left with a hydrogen/nitrogen mixture at shutdown, and the system is restarted before appreciable concentrations of oxygen have accumulated, cell corrosion during the shutdown and subsequent restart is avoided.

It is known in the art to purge the hydrogen gas out of the anode side of the fuel cell stack at system shutdown by forcing air from the compressor into the anode side at high pressure. However, the air purge creates an air/hydrogen front that causes at least some corrosion of the carbon support, as discussed above. Another known method in the art is to provide a cathode re-circulation to reduce carbon corrosion at system shutdown, as described in the commonly owned U.S. non-provisional patent application titled, "Method for Mitigating Cell Degradation Due to Startup and Shutdown Via Cathode Re-Circulation Combined with Electrical Shorting of Stack," U.S. Ser. No. 11/463,622, filed Aug. 10, 2006, which is incorporated herein by reference. Particularly, it is known to pump a mixture of air and a small amount of hydrogen through the cathode side of the stack at system shutdown so that the hydrogen and oxygen combine in the cathode side to reduce the amount of oxygen, and thus the potential that causes carbon corrosion.

It is also known to stop the cathode air flow while maintaining positive anode side hydrogen pressure at shutdown, and to then short the stack to allow the oxygen to be consumed by hydrogen, followed by closing the inlet and outlet valves of the anode and cathode sides, as described in the commonly owned U.S. non-provisional patent application titled, "Method of Mitigating Fuel Cell Degradation Due to Startup and Shutdown Via Hydrogen/Nitrogen Storage," U.S. Ser. No. 11/612,120, filed Dec. 18, 2006, which is incorporated herein by reference.

While it has been shown that these techniques do help to mitigate corrosion of the carbon support, these techniques may not remove all of the oxygen and may require additional components for a cathode recycle. Furthermore, the valves may not be leak tight, and the cooling of the gas and water vapor condensation after shutdown creates a vacuum which pulls air into the stack. Therefore, there is a need in the art to maintain adequate hydrogen concentration during fuel cell system off times to prevent oxygen from accumulating in the fuel cell stack. Furthermore, there is a need to limit the amount of hydrogen and electrical power consumed while maintaining adequate hydrogen concentrations needed for mitigation.

SUMMARY OF THE INVENTION

In accordance with the teachings of the present invention, a method for reducing the probability of an air/hydrogen front in a fuel cell stack is disclosed that includes closing anode valves for an anode side of the fuel cell stack to permit a desired quantity of hydrogen to be left in the anode side upon shutdown and determining a schedule to inject hydrogen during the time the fuel cell stack is shutdown. The pressure on an anode input line is determined and a discrete amount of hydrogen is injected into the anode side of the stack according to the determined schedule by opening anode input line valves based on the determined pressure along the anode input line so as to inject the hydrogen into the anode side of the stack.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for performing discrete injections of hydrogen after shutdown is merely exemplary in nature, and is in no way intended to limit the invention or its applications or uses.

Figure 1:
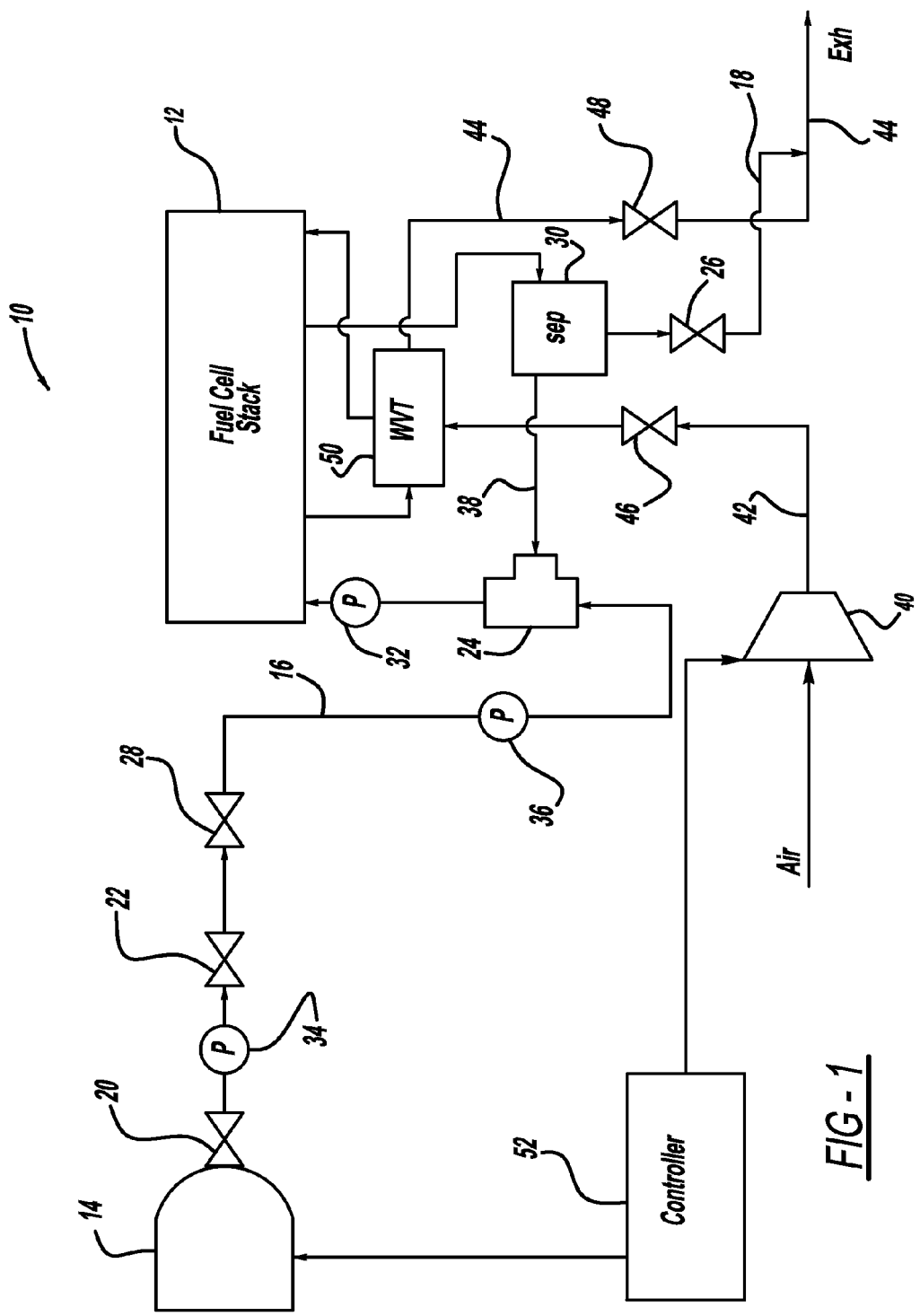
FIG. 1 is a schematic block diagram of a fuel cell system.

FIG. 1 is a schematic block diagram of a fuel cell system 10 including a fuel cell stack 12 having an anode side and a cathode side. An injector 24 injects hydrogen into the fuel cell stack 12 from a hydrogen source 14 on an anode input line 16. The injector 24 can be any injector, injector/ejector or bank of injectors suitable for the purposes described herein. An on-tank valve 20 on the hydrogen source 14 controls the flow of hydrogen from the hydrogen source 14. An isolation valve 22 is provided in the anode input line 16 between the hydrogen source 14 and the injector 24 to control the pressure in the anode input line 16, as will be discussed in more detail below. A pressure regulator 28 may also be included in the anode input line 16 to regulate the pressure of the hydrogen in the anode input line 16.

In this embodiment, the fuel cell system 10 employs anode recirculation where an anode recirculation gas is output from the stack 12 and is recirculated back to the anode input by an anode recirculation line 38 through the injector 24 to reduce the amount of hydrogen gas being discharged from the stack 12. Water is removed from the recirculated anode gas by a water separation device 30 provided in the anode recirculation line 38. The water separation device 30 collects and holds water in a manner well understood to those skilled in the art. A valve 26 is provided in an anode exhaust gas line 18 and is periodically opened to drain water from a holding tank in the water separator device 30, and is also periodically opened to remove nitrogen from the anode side of the stack 12 based on a predetermined process, such as a time schedule, sensors using closed-loop controls, models, etc., as is well understood to those skilled in the art.

A first pressure sensor 34 is provided between the on-tank valve 20 and the isolation valve 22, and a second pressure sensor 36 is provided between the isolation valve 22 and the injector 24 on the anode input line 16. A third pressure sensor 32 is provided between the injector 24 and the fuel cell stack 12 on the anode input line 16 to measure the pressure in the anode side of the fuel cell stack 12, as described in more detail below. In an alternative embodiment, the third pressure sensor 32 is provided on the anode recirculation line 38 to measure the pressure in the anode side of the fuel cell stack. In a second alternate embodiment, the isolation valve 22 is not part of the system 10.

A compressor 40 provides an air flow to the cathode side of the fuel cell stack 12 on a cathode input line 42 through a water vapor transfer (WVT) unit 50 that humidifies the cathode input air. A cathode exhaust gas line 44 directs the cathode exhaust to the WVT unit 50 to provide humidity to humidify the cathode input air. A cathode input valve 46 is provided on the cathode input line 42 and a cathode exhaust valve 48 is provided on the cathode exhaust gas line 44 to selectively control the flow of cathode air and cathode exhaust, respectively. A controller 52 is provided to control the hydrogen flow from the hydrogen source 14, the cathode air flow from the compressor 40, the position of the anode side valves 20, 22, 26, the injector 24, and the position of the cathode side valves 46 and 48. The controller 52 may control the position of the anode side valves 20 and 22 so that the valves 20 and 22 open and close in tandem to build pressure in the anode input line 16 in a cascading fashion, which is discussed in more detail below.

To protect the fuel cell stack 12 from damage during system 10 restart due to the presence of oxygen in the fuel cell stack 12, the anode side of the fuel cell stack 12 is injected with hydrogen according to a certain schedule after shutdown over a predetermined period of time. Shutdown may be indicated by a variety of triggers, including turning off the fuel cell system 10 or a vehicle that includes the system 10. If the system 10 is restarted before the predetermined period of time has elapsed, the schedule for injecting hydrogen is reset for the next shutdown. In addition, if the controller 52 detects certain stack conditions, or if the controller 52 determines that a vehicle key is in the accessory or on position, the method for injecting hydrogen may be disabled. These aspects of the present invention are described in more detail below.

Upon shutdown, the valve 26 is closed, and the anode input line valves 20 and 22 are closed after a predetermined period of time or a predetermined amount of pressure is achieved in the anode input line 16. Similarly, upon shutdown the injector 24 stops injecting hydrogen after a predetermined period of time, a predetermined amount of pressure or a predetermined quantity of hydrogen is achieved in the anode side of the stack 12. Before air begins to overtake the hydrogen within the anode side of the stack 12, scheduled injections of hydrogen are provided to the anode side, as described in more detail below.

Hydrogen may be injected into the anode side of the stack 12 to a specified pressure to control the total amount of hydrogen injected during each scheduled injection. As would be readily apparent to those skilled in the art, hydrogen may be injected into the anode side of the stack 12 to a variety of pressures. In one non-limiting embodiment, injecting hydrogen into the anode side of the stack to approximately 50 kPa is suitable and within the pressure limits of a typical fuel cell stack used in vehicle applications. The amount of hydrogen injected into the anode side of the stack 12 during each scheduled injection may be confirmed through metering of the injector 24, and should be limited based on the metering device, or by some other suitable means, to avoid excess injection of hydrogen due to faulty pressure sensors or due to leaks in the anode side that prevent the pressure from increasing as expected.

Hydrogen may also be injected into the cathode side of the stack 12, however, maintaining an inert gas within the cathode side of the fuel cell stack 12 is preferred. While a low injection amount or a continuous injection method may be used, it is difficult to meter such small amounts. Furthermore, the addition of hydrogen requires controls and monitoring devices and systems, which in turn require a certain amount of power. Thus, discrete injections of hydrogen are preferred to ensure accurate metering of the hydrogen and to limit the power required to control and monitor the hydrogen injection process.

As will be described in more detail below, hydrogen from the anode input line 16 is used to supply the scheduled injections of hydrogen using the injector 24. The schedule of hydrogen injections may be determined based on gas concentration modeling or specified time intervals. Those calibrations need to account for excessive air convection due to water vapor condensation as the stack 12 cools. As a result, the timing of the initial hydrogen injections may be further adjusted based on various inputs including ambient air temperature and stack conditions, such as stack temperature at shutdown. For example, if the stack 12 is warmer than average or ambient air temperature is colder than average, i.e., a larger than expected temperature spread between the fuel cell stack 12 and ambient is detected, additional gas contraction would be expected, therefore the initial scheduled hydrogen injection may need to occur sooner after shutdown of the fuel cell system 10. In such a situation, it is expected that the second and subsequent scheduled hydrogen injections would also need to be rescheduled.

Adjustments to the schedule as initially determined from the calibration tests for performing the hydrogen injections may also occur due to the existence of air within the stack 12. Air may be detected based on cell or stack voltage rise, as has been confirmed through gas sampling. A change in voltage indicates that oxygen is present and is reacting with the hydrogen, as is readily apparent to those skilled in the art. Based on the presence and magnitude of voltage, the schedule for performing the hydrogen injections may be adjusted. If, for example, the voltage measurement during an injection of hydrogen or during startup of the fuel cell system 10 is higher than expected, the algorithm for the controller 52 may adapt to allow future hydrogen injections to occur after shorter time intervals, i.e., sooner than originally scheduled. However, a change in voltage of the stack 12 indicates that air or oxygen has already entered the stack 12, possibly causing damage. Thus, monitoring stack voltage may not provide an early enough indicator to prevent oxygen or air from entering the stack 12, meaning an air/hydrogen front will be pushed through the stack 12 each time hydrogen is injected, which is undesirable.

Injection events may be performed ahead of the schedule determined from the calibration tests by adapting the schedule to inject hydrogen to include a margin of error to account for variations in operational conditions from stack to stack, changes in environmental conditions, and other variations which may be observed from stack to stack. In addition, the timing of the hydrogen injections may need to be adjusted according to the age of the fuel cell stack 12, as the sealing effectiveness may decrease over time as components of the fuel cell stack age, and because there may be variability between individual systems, as discussed above.

The pressure within the hydrogen input line 16 should remain constant between hydrogen injections if there are not any leaks in the system 10. A reduction in pressure, as measured by pressure sensors 34 and 36, could indicate a leak, and the algorithm may determine that the pressure reduction is significant enough to abort the hydrogen injection process to avoid wasting hydrogen and also to ensure hydrogen emissions do not exceed allowable levels. The pressure at the pressure sensor 32 is expected to decay due to crossover and reaction with air that has diffused into the stack, therefore, pressure sensor 32 is not used in determining whether to abort the hydrogen injection process.

During start-up of the fuel cell system 10, if a discharge circuit is connected to the fuel cell stack 12, an electric current can be measured to determine the relative hydrogen partial pressures of the cathode side to the anode side. The measured electric current may then be used to calculate the gas composition of the cathode active area to determine the hydrogen content within the cathode active area. If the hydrogen composition is lower than expected, the algorithm could adapt so that future hydrogen injections take place after a shorter time interval, i.e., sooner than originally scheduled. The ability of the algorithm to adapt as described above allows the algorithm to account for variations in fuel cell systems due to hardware variations as well as system life cycles. Alternatively, a gas analyzer could be used to determine if oxygen is present, however, the addition of a gas analyzer to the fuel cell system 10 would add more components and costs associated with the system.

To minimize the amount of hydrogen that needs to be added to the anode side of the fuel cell stack 12, the entry of oxygen from ambient air may be minimized by closing cathode side valves, such as the cathode input valve 46 and the cathode exhaust valve 48. Furthermore, to limit the amount of air pulled into the stack 12 after shutdown due to gas contraction and water vapor condensation, the stack 12 may be cooled prior to shutdown.

Prior to, during and after an injection of hydrogen into the anode side of the fuel cell stack 12, the anode input pressure sensors 34, 36 and 32 may be used to verify that hydrogen leaks have not occurred. For example, if the anode pressure at the pressure sensor 32 does not rise during the addition of hydrogen, this may indicate that the hydrogen is leaking out of the anode side at some location, and the algorithm may disable the hydrogen injection process and abort future scheduled hydrogen injections.

During those off times when the vehicle in which the fuel cell system 10 is placed or when the system 10 itself is being serviced, the injection of hydrogen during shutdown may be disabled. Servicing may be detected in several ways, including through a service specific switch or by removing component covers that include an interlock switch. As is known to those having skill in the art, other mechanisms for detecting that the vehicle or system 10 is being serviced may be utilized.

The method for performing scheduled injections of hydrogen during shutdown may be disabled under other circumstances as well, such as when the vehicle or system 10 has been left shutdown for long periods of time. By way of example, the method for injecting hydrogen may be disabled after 48 hours from shutdown, as the benefits of continuing to perform injections of hydrogen diminish as time goes on. This may be necessary to ensure excess battery power is not consumed, as a certain amount of battery power will be required for system restart. For example, the method for injecting hydrogen may be disabled if the low voltage power available in the fuel cell system 10 drops below a predetermined threshold level.

There could be occasions when the strategy would not be desired. For example, if there was an intention to oxidize anode contaminants, air could be placed in the anode subsystem. The method for injecting hydrogen during shutdown as described herein will be suspended in that event.

Hydrogen that is injected into the anode side will cross the proton conducting membrane and enter the cathode side, and will come to equilibrium over a period of time, usually several minutes. When the levels of hydrogen in the cathode side are high, the air from the compressor 40 upon start-up of the fuel cell system 10 will force the hydrogen in the cathode side into the cathode exhaust line 44. If the air flow is selected incorrectly, the concentration of hydrogen in the cathode exhaust line 44 may exceed the allowable level of hydrogen emissions, therefore, the hydrogen in the cathode exhaust line 44 must be handled by the fuel cell system 10 or by operational methods, as is readily apparent to those skilled in the art.

Figure 2A:
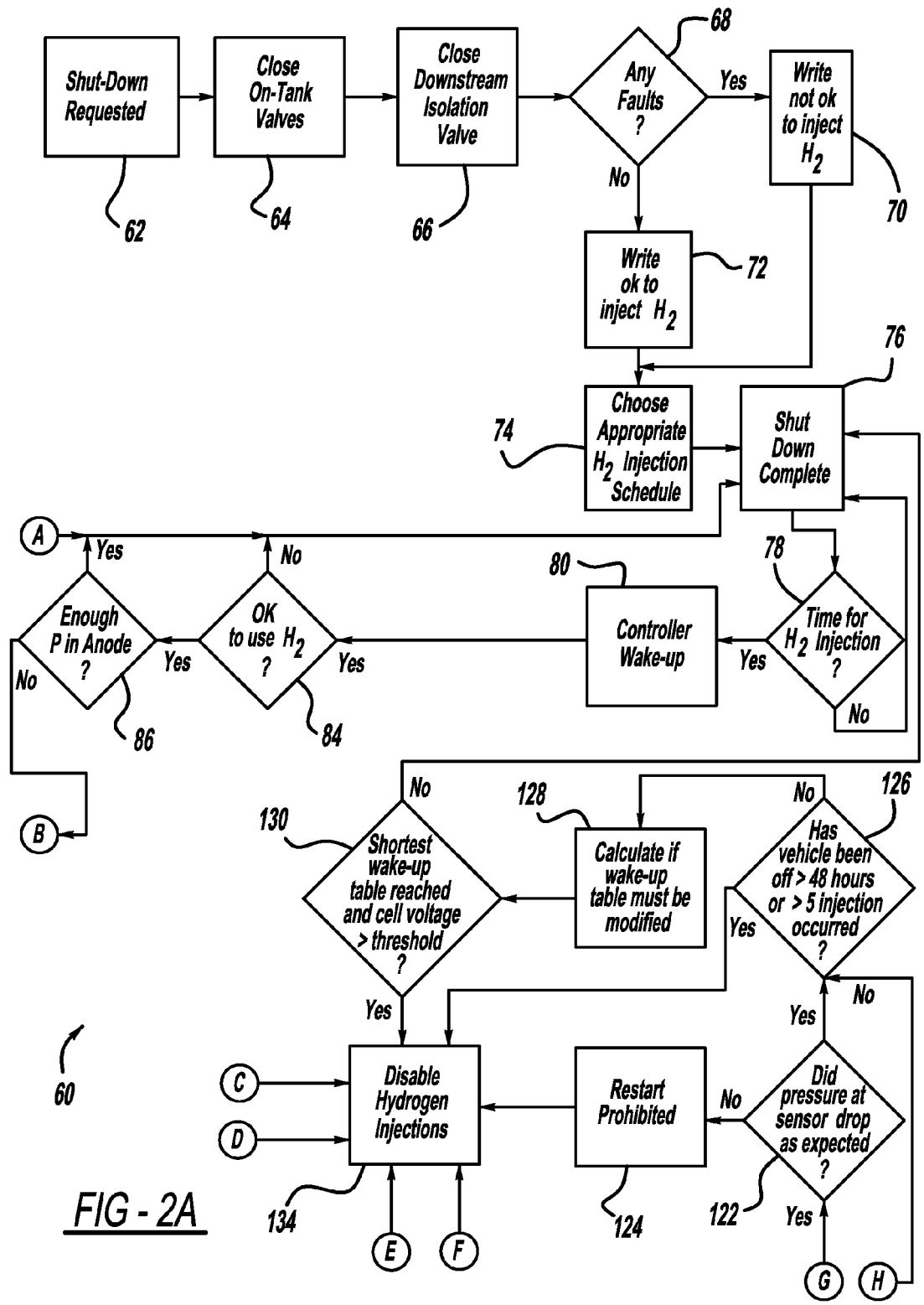
FIGS. 2A and 2B are a flow diagram illustrating a non-limiting embodiment of the method for hydrogen addition after shutdown.
Figure 2B:
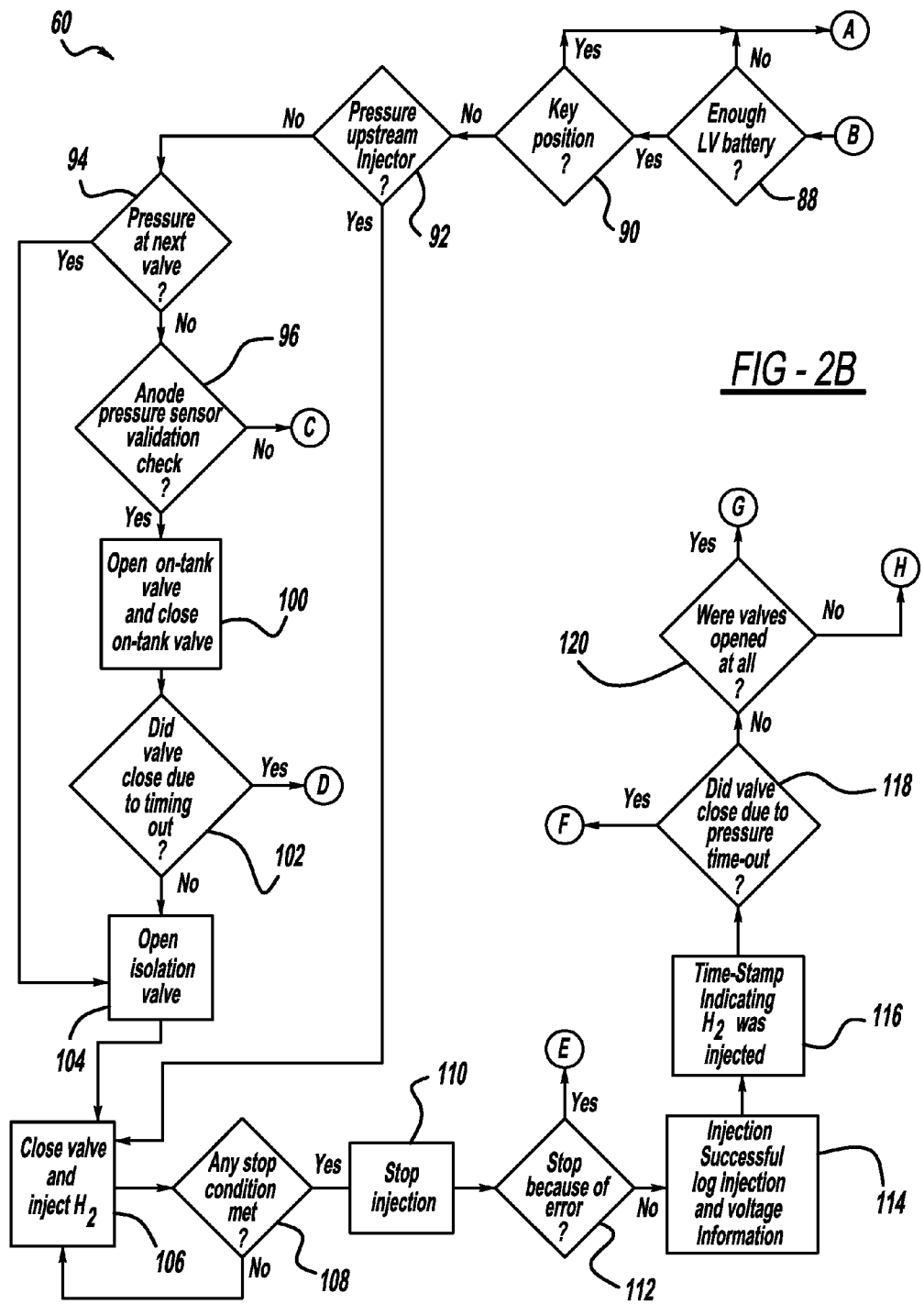

FIGS. 2A and 2B are a flow diagram 60 showing a non-limiting embodiment for carrying out the method of performing the scheduled injections of hydrogen during shutdown into the anode side of the fuel cell stack 12 for the purpose of preventing air from entering the anode side and causing an air/hydrogen front to be generated in the stack 12 during system shutdown. Once shutdown is requested at box 62, the on-tank valve 20 on the hydrogen source 14 is closed at box 64. Next, the isolation valve 22 is closed at box 66. As is known to those having skill in the art, the valve 26 is typically only opened for the purpose of periodically bleeding nitrogen and water and other fluids out of the anode side of the stack 12. Thus, at system shutdown the valve 26 is typically already closed.

After the on-tank valve 20 and the isolation valve 22 are closed the algorithm determines whether there are any existing faults that should prevent the hydrogen injections from occurring during shutdown of the fuel cell system 10 at decision diamond 68. A number of faults can be used to determine whether or not to allow the hydrogen injections to occur, including faults from the previous scheduled hydrogen injections during a prior shutdown which have been stored in the non-volatile memory of the controller 52. Determining if the vehicle is being serviced or if stack reconditioning is needed may also indicate a fault and therefore prevent the hydrogen injections during shutdown from occurring. Other indicators for disabling the scheduled hydrogen injections during shutdown may also be used without departing from the scope of the present invention.

If the algorithm determines that the scheduled hydrogen injections should not occur after shutdown at the decision diamond 68, a bit disabling the scheduled hydrogen injections is stored in a memory of the controller 52 at box 70. If, however, the controller 52 determines that the scheduled hydrogen injections may occur after shutdown at the decision diamond 68, a bit allowing the scheduled hydrogen injections is stored in the memory of the controller 52 at box 72. Once the appropriate decision has been stored in the memory of the controller 52, the appropriate hydrogen injection schedule is selected at box 74. If a bit disabling hydrogen injections was stored in the controller 52 at the box 70, the appropriate hydrogen injection schedule is a schedule that does not allow hydrogen injections. As discussed above, the appropriate schedule is determined based on a variety of factors, including calibration tests, stack temperature, ambient temperature, and the age of the stack 12. Other factors may be included when determining the appropriate hydrogen injection schedule at the box 74 without departing from the scope of the invention.

After the appropriate hydrogen injection schedule is selected at the box 74, shutdown of the fuel cell system 10 is considered complete at box 76. When the shutdown is complete, the controller 52 is off and the on-tank valve 20, the isolation valve 22 and the valve 26 are closed and the injector 24 is not injecting hydrogen. The fuel cell system 10 remains shutdown until the next restart or until the time for injecting hydrogen is attained at decision diamond 78, as determined by the hydrogen injection schedule discussed above.

If the time for waking up the controller 52 and performing the scheduled hydrogen injection has not been reached at the decision diamond 78, the fuel cell system 10 remains off by returning to the box 76, and the shutdown conditions are maintained. Once the time for performing the first scheduled hydrogen injection is reached at the decision diamond 78, based on the appropriate hydrogen injection schedule determined at the box 74, the controller 52 wakes up at box 80.

After the controller 52 wakes up at the box 80, the algorithm determines whether it is okay to perform the scheduled hydrogen injection at decision diamond 84. At the decision diamond 84 the algorithm looks at the data stored from the previous operation of the fuel cell system 10 prior to shutdown to determine whether it is desirable to perform the scheduled injection of hydrogen. An example condition for not allowing a hydrogen injection would be data stored indicating that the injector 24 is stuck open. However, a variety of conditions may exist that would indicate it is not desirable to perform the scheduled hydrogen injection, such as a variety of safety conditions. If it is determined that it is not desirable to inject hydrogen, the system 10 returns to the shutdown state at the box 76. Alternatively, the algorithm could be written in reverse. Thus, if it is not desirable to inject hydrogen, for example due to a potentially malfunctioning valve, the controller would be told to not wake up until whatever is the problem is eliminated.

If the algorithm determines that it is okay to perform the scheduled hydrogen injection at the decision diamond 84, the algorithm then determines whether there is adequate pressure within the anode side of the stack 12 using the anode input line pressure sensor 32 at decision diamond 86. If there is enough pressure in the anode side of the stack 12 as determined by the anode input line pressure sensor 32 at the decision diamond 86, the scheduled injection of hydrogen is not performed. This is likely either the result of the controller waking up too early and there is still significant hydrogen present, or the sensor has malfunctioned, or the inlet injector has leaked. An example of sufficient pressure is 110 kPa, however, those having skill in the art will recognize a variety of pressures may be employed, and that the optimal pressure will vary depending on the fuel cell system 10. If the algorithm determines there is adequate hydrogen present in the anode side of the stack 12, the algorithm may adjust the hydrogen injection schedule to allow the scheduled hydrogen injection to occur after a longer period of time has elapsed than initially calibrated.

If, however, the pressure is below a predetermined threshold level at the time for the scheduled injection of hydrogen, then the algorithm determines whether there is enough low voltage battery power to perform the scheduled hydrogen injection at decision diamond 88. If the algorithm determines that the low voltage battery power available is below a predetermined threshold value at the decision diamond 88, the fuel cell system 10 remains shutdown and the algorithm returns to the shutdown complete state at the box 76. If, however, the low voltage battery power available is above the predetermined threshold value at the decision diamond 88, the algorithm determines whether the fuel cell system 10 or vehicle key is in the on or the accessory position at decision diamond 90. If the key position is in the on or accessory position at the decision diamond 90, the algorithm will not allow the scheduled injection of hydrogen to occur because it is expected that the vehicle and/or the fuel cell system 10 will be restarted soon, so the process returns to the shutdown state at the box 76. However, the algorithm may override the decision to not allow scheduled injections of hydrogen at the decision diamond 90 under certain circumstances, such as during servicing of the system 10. One skilled in the art will recognize that a variety of conditions may exist that require overriding the disabling or enabling of the hydrogen injections, although not specifically disclosed in this non-limiting embodiment.

If the algorithm determines that the key is not in the on or accessory position at the decision diamond 90, the algorithm determines if the pressure at the pressure sensor 36 is sufficient to allow the injector 24 to perform the scheduled hydrogen injection without opening the isolation valve 22 or the on-tank valve 20 at decision diamond 92. If the pressure at the pressure sensor 36 is greater than a predetermined threshold, the algorithm will allow the scheduled hydrogen injection to occur using the injector 24 at box 106 which is discussed in more detail below. If the pressure in the anode input line 16 as measured by the pressure sensor 36 is inadequate, the algorithm requires a different sequence of events to occur, which are described in detail below. A non-limiting example of adequate pressure is a pressure greater than 500 kPa at the pressure sensor 36. However, the amount of pressure required in the anode input line 16 may vary depending on the volume of hydrogen required for the schedule hydrogen injection. A non-limiting example of the volume of hydrogen required for the scheduled hydrogen injection is approximately 0.2 grams of hydrogen. Furthermore, in an alternate embodiment, the decision diamonds 84-92 could be arranged in a different order without departing from the scope of the invention.

If the pressure at the pressure sensor 36 is determined to be inadequate at the decision diamond 92, the pressure at the pressure sensor 34 is determined at decision diamond 94. If the pressure at the pressure sensor 34 is above a predetermined threshold, the scheduled hydrogen injection may occur by opening the isolation valve 22 at box 104, thereby building pressure in the anode input line 16 between the isolation valve 22 and the injector 24 while keeping the on-tank valve 20 closed. The on-tank valve 20 may remain closed during the scheduled hydrogen injection because enough pressure exists in the anode input line 16 between the valves 20 and 22 to provide for the scheduled injection of hydrogen, thus hydrogen from the hydrogen source 14 is not required.

If the pressure at the pressure sensor 34 is determined to be inadequate to perform the scheduled hydrogen injection at the decision diamond 94, the algorithm checks to ensure that the pressure sensors 34, 36 and 32 in the anode input line 16 are operating as expected at decision diamond 96. This helps to ensure that any leaks or malfunctions in the valves 20, 22, 26 and 28 are detected to avoid over-pressurizing the anode side of the stack 12 and wasting hydrogen during the scheduled hydrogen injections. If any of the pressure sensors 34, 36 and 32 are not operating as expected at the decision diamond 96, the algorithm disables the method for performing the scheduled hydrogen injections at box 134. If the pressure sensors 34, 36 and 32 are determined to be operating as desired at the decision diamond 96, the algorithm opens the on-tank valve 20, keeps the isolation valve 22 closed, and closes the on-tank valve 20 when sufficient pressure has been attained at the pressure sensor 34 at box 100. A non-limiting example of sufficient pressure is greater than 25 bar at the pressure sensor 34. The algorithm also closes the on-tank valve 20 when a threshold increase in pressure is detected at the pressure sensor 36, or the pressure sensor 32, or when a certain period of time has passed, to avoid wasting hydrogen and/or over-pressurizing the anode side of the stack 12. For example, if the pressure at the pressure sensor 36 reaches a predetermined pressure, such as 150 kPa or higher, or if five seconds pass, the on-tank valve 20 is closed, regardless of whether or not the target pressure at the pressure sensor 34 is attained. Other pressure values or time frames may be used without departing from the scope of the present invention.

Next, the algorithm determines if the on-tank valve 20 is closed at the box 100 due to an unexpected increase in pressure at the pressure sensors 36 or 32, because five seconds passed, if the hydrogen concentration in the exhaust 44 exceeds some predetermined threshold, or if the hydrogen was sent somewhere it was not supposed to go at decision diamond 102. If yes, the algorithm disables the method for performing the scheduled injections of hydrogen at the box 134.

If the on-tank valve 20 did not close at the box 100 due to an error condition, such as one of the conditions previously described, but instead closed because the desired pressure was attained at the pressure sensor 34, then the isolation valve 22 is opened at the box 104 and the on-tank valve 20 is kept closed. The isolation valve 22 remains open until the pressure at the pressure sensor 36 is greater than a predetermined pressure, such as 600 kPa. However, the isolation valve 22 will close early if a certain period of time, such as five seconds, has passed or if the pressure at the pressure sensor 36 exceeds a predetermined value, such as 850 kPa. In addition, the isolation valve 22 may be closed early if the pressure within the anode side of the stack 12 as measured by the pressure sensor 32 exceeds a predetermined threshold value, or if the amount of hydrogen in the exhaust 44 exceeds a predetermined amount. The method of opening and closing the on-tank valves 20 and the isolation valve 22 in a cascading fashion toward the fuel cell stack 12 as described above helps to ensure hydrogen is not wasted and the anode side of the stack 12 is not over-pressurized during the scheduled injection of hydrogen.

Once the isolation valve 22 is opened at the box 104, the injector 24 injects hydrogen into the anode side of the fuel cell stack 12 at the box 106, as occurs if the pressure is adequate at the box 92 as described above. After the injector 24 begins the scheduled injection of hydrogen at the box 106, the algorithm determines if any stop condition is met at decision diamond 108. If not, the algorithm returns to the box 106 and continues the scheduled injection of hydrogen. An example of a stop condition is when the pressure in the anode side of the stack 12, as measured by the pressure sensor 32, increases to a predetermined value, such as 200 kPa. When a stop condition is met at the decision diamond 108, the algorithm will stop the scheduled injection of hydrogen at box 110. Next, the algorithm determines if the stop condition was due to an error condition at decision diamond 112. Examples of error conditions include a predetermined threshold period of time being exceeded, such as three seconds, or if the concentration of hydrogen in the exhaust 44 exceeds a predetermined threshold. If the scheduled hydrogen injection was stopped due to an error condition at the box 110, as determined at the decision diamond 112, the algorithm disables the method for performing the scheduled injections of hydrogen at the box 134.

If the scheduled hydrogen injection was not stopped due to an error condition, the completed injection is considered successful and data is gathered regarding the completed injection and stored at box 114. For example, if the pressure in the anode side of the stack 12 as measured by the pressure sensor 32 reaches a pressure that is 40 kPa above ambient and if the anode input line 16 pressure at the pressure sensor 36 decreases by 100 kPa, or if the pressure of the anode side of the stack rises above 200 kPa, the scheduled hydrogen injection is considered successful. The combination of pressure increasing in the anode side of the stack 12 and pressure decreasing in the anode input line 16 at the pressure sensor 36 implies that the hydrogen was properly injected into the stack 12, and that the isolation valve 22 was closed during the scheduled injection of hydrogen. If the pressure in the anode side of the fuel cell stack 12 increases to 40 kPa above ambient, but the pressure in the anode input line 16 has not dropped by 100 kPa at the pressure sensor 36, the algorithm will keep injecting hydrogen until the pressure in the anode input line 16 at the pressure sensor 36 decreases by 100 kPa or until the pressure in the anode side of the stack as measured by the pressure sensor 32 rises above 200 kPa. Once the successful hydrogen injection data is stored at the box 114, the completed injection event is time-stamped at box 116 to indicate when the successful injection occurred.

Once the completed injection event is time-stamped at the box 116, the algorithm determines if the isolation valve 22 closed during the scheduled injection event due to an error, such as an unexpected increase in pressure or if a predetermined threshold period of time has passed at decision diamond 118. If there was an error at the decision diamond 118 the method for performing the scheduled injections of hydrogen is disabled at the box 134. If the isolation valve 22 did not close due to an error, the algorithm determines if either the on-tank valve 20 or the isolation valve 22 was opened at all during the scheduled hydrogen injection event at decision diamond 120. If one or both of the valves 20 and 22 were opened during the scheduled hydrogen injection event, the algorithm determines if the pressure in the anode input line 16 at the pressure sensor 36 dropped as expected at decision diamond 122.

If the pressure in the anode input line 16 at the pressure sensor 36 did not drop as expected at the decision diamond 122, future restarts of the fuel cell system 10 are prohibited at box 124. The pressure in the anode input line 16 at the pressure sensor 34 may also be evaluated at the decision diamond 122, although not a part of this non-limiting embodiment. If the pressure in the anode input line 16 at the pressure sensor 36 did drop as expected at the decision diamond 122, or if the algorithm determines that the on-tank valve 20 and the isolation valve 22 were not opened during the scheduled hydrogen injection at the decision diamond 120, the algorithm determines, for example, if the vehicle and/or fuel cell system 10 has been shut down for longer than 48 hours or if more than five scheduled injections of hydrogen have occurred during the shutdown period at decision diamond 126. If 48 hours have passed or if more than five scheduled hydrogen injections have occurred, the method for performing the scheduled injections of hydrogen is disabled at the box 134 for the remainder of the shutdown period.

If the algorithm determines that the vehicle and/or fuel cell system 10 has not been shut down for longer than 48 hours and more than five scheduled hydrogen injections have not occurred during the shutdown period at the decision diamond 126, the algorithm will next determine whether the hydrogen injection schedule must be modified at box 128. For example, if the maximum cell voltage during the scheduled hydrogen injection is greater than a predetermined threshold value, such as 300 mV, then the hydrogen injection schedule may be modified so that the next scheduled hydrogen injection will occur sooner than originally scheduled. Other conditions may also be taken into consideration when adjusting the hydrogen injection schedule at the box 128 without departing from the scope of the present invention.

Once the algorithm determines whether it is desirable to adjust the hydrogen injection schedule at the box 128, the algorithm will determine if the shortest hydrogen injection schedule allowed has already been attained, and if the cell voltage still exceeds a predetermined threshold at decision diamond 130. If yes, the hydrogen injection schedule cannot be shortened because a practical limit has been reached, and the method for performing the scheduled injections of hydrogen is disabled at the box 134. If the shortest hydrogen injection schedule has not been reached the algorithm returns to the shutdown complete stage at the box 76 because the shortest hydrogen injection schedule allowed has not been attained and the hydrogen injection schedule may be adjusted as desired for the next scheduled injection of hydrogen.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for reducing the probability of an air/hydrogen front in a fuel cell stack, said method comprising:
   determining that the fuel cell system has been shutdown;
   placing the fuel cell system in a shutdown state if it is determined that the fuel cell system has been shutdown;
   maintaining the shutdown state of the fuel cell system until a scheduled hydrogen injection;
   determining whether errors that would prevent a hydrogen injection from occurring exist;
   determining there is adequate pressure in an anode input line to the fuel cell stack to perform the hydrogen injection;
   injecting a discrete amount of hydrogen into the anode side of the fuel cell stack according to a predetermined scheduled hydrogen injection using the pressure in the anode input line; and
   returning to the shutdown state until a next scheduled hydrogen injection.

2. The method according to claim 1 wherein each injection of a discrete amount of hydrogen into the anode side of the stack according to the predetermined scheduled hydrogen injection using the pressure in the anode input line occurs before oxygen or air begins to overtake the anode side of the fuel cell stack.

3. The method according to claim 1 further comprising increasing the pressure in the anode input line by opening valves in the anode input line in a cascading fashion.

4. The method according to claim 1 wherein the amount of hydrogen injected into the anode side of the fuel cell stack during each predetermined scheduled hydrogen injection using the pressure in the anode input line ends when a predetermined pressure on the anode side of the stack is achieved.

5. The method according to claim 4 wherein the predetermined pressure on the anode side of the fuel cell stack is less than 200 kPa.

6. The method according to claim 1 wherein the hydrogen injection from the predetermined scheduled hydrogen injection using the pressure in the anode input line ends after a predetermined threshold period of time, regardless of whether a desired pressure in the anode side of the stack is attained.

7. The method according to claim 1 wherein the hydrogen injection from the predetermined scheduled hydrogen injection using the pressure in the anode input line ends after a predetermined threshold amount of hydrogen has been metered, regardless of the amount of time that has passed and regardless of whether a desired anode side pressure is attained.

8. The method according to claim 1 wherein the predetermined schedule to inject hydrogen using the pressure in the anode input line is initially based on calibration testing of the fuel cell system and sensor feedback from the fuel cell system.

9. The method according to claim 8 wherein the predetermined schedule to inject hydrogen using the pressure in the anode input line is adjusted periodically to account for the age of the fuel cell stack.

10. The method according to claim 8 wherein an initial hydrogen injection of the predetermined scheduled hydrogen injection using the pressure in the anode input line occurs after a shorter period of time has elapsed relative to later hydrogen injections to compensate for initial gas contraction and water vapor condensation due to cooling of the fuel cell stack.

11. The method according to claim 1 further comprising detecting oxygen or air in the stack by measuring the voltage of fuel cells in the fuel cell stack during each injection of hydrogen according to the predetermined schedule or during startup of the fuel cell stack.

12. The method according to claim 11 wherein each hydrogen injection occurs ahead of schedule if a predetermined threshold rise in voltage is measured during a previous injection of hydrogen according to the predetermined schedule.

13. The method according to claim 1 further comprising closing cathode inlet and cathode outlet valves upon shutdown of the fuel cell stack to prevent oxygen or air from entering the stack.

14. The method according to claim 1 wherein the pressure in the anode side of the fuel cell stack increases to approximately 200 kPa during each injection of hydrogen.

15. A method for reducing the probability of an air/hydrogen front in a fuel cell stack, said method comprising:
 closing anode valves in an anode side of the fuel cell stack to permit a desired quantity of hydrogen to be left in the anode side upon shutdown;
 determining a schedule to inject hydrogen during the time the fuel cell stack is shutdown;
 determining the pressure on an anode input line and determining the pressure in the anode side of the stack; and
 injecting hydrogen into the anode side of the stack according to the determined schedule by opening the anode input line valve or valves necessary based on the determined pressure along the anode input line so as to inject the hydrogen into the anode side of the stack.

16. The method according to claim 15 wherein the amount of hydrogen injected into the anode side of the stack according to the determined schedule ends when a predetermined pressure on the anode side of the stack is achieved.

17. The method according to claim 15 wherein the hydrogen injected during the determined schedule ends when the pressure on the anode side of the stack is less than 200 kPa.

18. The method according to claim 15 wherein the amount of hydrogen injected into the anode side of the stack according to the determined schedule ends after a predetermined threshold period of time, regardless of whether a desired anode side pressure is attained.

19. The method according to claim 15 wherein the hydrogen injection according to the determined schedule ends after a predetermined threshold amount of hydrogen has been metered, regardless of the amount of time that has passed and regardless of whether a desired anode side pressure is attained.

20. The method according to claim 15 wherein the schedule to inject hydrogen into the anode side of the stack according to the determined schedule is initially based on calibration testing of the fuel cell system and sensor feedback from the fuel cell system.

21. The method according to claim 15 wherein the schedule to inject hydrogen into the anode side of the stack according to the determined schedule is adjusted periodically to account for the age of the fuel cell stack.

22. The method according to claim 15 further comprising detecting oxygen or air in the stack by measuring the voltage of fuel cells in the fuel cell stack during each injection of hydrogen according to the determined schedule or during startup of the fuel cell stack.

23. The method according to claim 22 wherein hydrogen injections occur ahead of schedule if a predetermined threshold rise in voltage of the fuel cells of the fuel cell stack is measured during a hydrogen injection.

24. The method according to claim 15 further comprising closing cathode inlet and cathode outlet valves upon shutdown of the fuel cell stack to prevent oxygen or air from entering the fuel cell stack.

25. The method according to claim 15 wherein the pressure in the anode side of the stack increases to approximately 200 kPa during each injection of hydrogen.

26. A method for reducing the probability of an air/hydrogen front in a fuel cell stack, said method comprising:
 determining that the fuel cell system has been shutdown;
 placing the fuel cell system in a shutdown state if it is determined that the fuel cell system has been shutdown;
 wherein placing the fuel cell system in a shutdown state includes closing anode side valves to permit a desired quantity of hydrogen to be left in the anode side of the stack;
 wherein placing the fuel cell system in a shutdown state includes closing cathode side valves in the stack to prevent oxygen or air from entering the stack;
 determining a schedule to inject hydrogen during the time the fuel cell stack is shutdown;
 maintaining the shutdown state until a scheduled hydrogen injection time is reached;

determining whether errors exist that would prevent a hydrogen injection from occurring;

determining there is adequate pressure in an anode input line to the fuel cell stack to perform the hydrogen injection;

injecting a discrete amount of hydrogen into the anode side of the stack according to the predetermined schedule using an injector; and returning to the shutdown state after the hydrogen injection ends or if any error conditions exist.

27. The method according to claim 26 wherein the amount of hydrogen injected into the anode side during each predetermined hydrogen injection ends when a predetermined pressure on the anode side of the stack is achieved.

28. The method according to claim 27 wherein the hydrogen is injected to a pressure in the anode side of the fuel cell stack that is less than 200 kPa.

29. The method according to claim 26 wherein the amount of hydrogen injected into the anode side during each predetermined hydrogen injection ends after a predetermined threshold period of time, regardless of whether a desired pressure in the anode side of the fuel cell stack is attained.

30. The method according to claim 26 wherein the amount of hydrogen injected into the anode side during each predetermined scheduled hydrogen injection ends after a predetermined threshold amount of hydrogen has been metered, regardless of the amount of time that has passed and regardless of whether the desired anode pressure is attained.

31. The method according to claim 26 wherein the predetermined schedule to inject hydrogen is initially based on calibration testing of the fuel cell system and sensor feedback from the fuel cell system.

32. The method according to claim 26 wherein an initial hydrogen injection of the predetermined scheduled hydrogen injection occurs after a shorter period of time has elapsed than initially scheduled to compensate for initial gas contraction and water vapor condensation due to cooling of the fuel cell stack.

33. The method according to claim 26 further comprising detecting oxygen or air in the stack by measuring the voltage of the fuel cells in the fuel cell stack during each injection of hydrogen according to the predetermined schedule.

34. The method according to claim 33 wherein following hydrogen injections occur ahead of the predetermined schedule if a threshold rise in voltage is detected during a hydrogen injection.

35. The method according to claim 26 wherein the pressure in the anode side of the stack increases to approximately 200 kPa during each injection of hydrogen.

* * * * *